(12) United States Patent
Kamegai et al.

(10) Patent No.: US 8,241,694 B2
(45) Date of Patent: Aug. 14, 2012

(54) FAT AND OIL COMPOSITIONS FOR IMPROVING TEXTURE

(75) Inventors: Takeshi Kamegai, Yokosuka (JP); Junichi Ikuina, Yokosuka (JP)

(73) Assignee: The Nisshin OilliO Group, Ltd., Tokyo (JP)

( * ) Notice: Subject to any disclaimer, the term of this patent is extended or adjusted under 35 U.S.C. 154(b) by 398 days.

(21) Appl. No.: 12/526,063

(22) PCT Filed: Feb. 6, 2008

(86) PCT No.: PCT/JP2008/051943
§ 371 (c)(1),
(2), (4) Date: Aug. 6, 2009

(87) PCT Pub. No.: WO2008/096785
PCT Pub. Date: Aug. 14, 2008

(65) Prior Publication Data
US 2010/0323084 A1     Dec. 23, 2010

(30) Foreign Application Priority Data

Feb. 9, 2007 (JP) ................................. 2007-030047

(51) Int. Cl.
*A23D 9/007* (2006.01)
(52) U.S. Cl. ........................................ 426/606; 426/611
(58) Field of Classification Search .................. 426/606, 426/611
See application file for complete search history.

(56) References Cited

U.S. PATENT DOCUMENTS

| | | | |
|---|---|---|---|
| 5,897,906 A | 4/1999 | Suwa et al. | |
| 2003/0068426 A1* | 4/2003 | Idris et al. | 426/601 |
| 2003/0143313 A1 | 7/2003 | Ikuina et al. | |
| 2005/0043554 A1 | 2/2005 | Ikuina et al. | |
| 2005/0214435 A1 | 9/2005 | DesBois et al. | |

FOREIGN PATENT DOCUMENTS

| | | | |
|---|---|---|---|
| FR | 2 841 097 A1 | 12/2003 | |
| GB | 2 350 618 A | 12/2000 | |
| JP | 63-079560 A | 4/1988 | |
| JP | 63-079650 | * | 4/1988 |
| JP | 8-154610 A | 6/1996 | |
| JP | 8-298928 A | 11/1996 | |
| JP | 09-299027 A | 11/1997 | |
| JP | 09-310088 A | 12/1997 | |
| JP | 2001-149010 A | 6/2001 | |
| JP | 2001-197862 A | 7/2001 | |
| JP | 2003-313583 A | 11/2003 | |
| JP | 2004-189965 A | 7/2004 | |
| JP | 2005-237313 A | 9/2005 | |
| WO | WO 99/51102 A1 | 10/1999 | |
| WO | WO 2006/117846 A1 | 11/2006 | |

OTHER PUBLICATIONS

Tang, T. S. 1995. Porim Technology No. 17, Nov. 1995. Palm Oil Research Institute of Malaysia, Kenemterian Perusahaan Utama, Malaysia, p. 1-9.*
NorAini, I. 1992. JAOCS 69(12)1206-1209.*
International Search Report (PCT/ISA/210) for PCT/JP2008/051943, mailed Mar. 11, 2008.
Written Opinion (PCT/ISA/237) for PCT/JP2008/051943, mailed Mar. 11, 2008.
Toyota, "Reports on Flowery Coating of Fat Composition (2)," Jan. 30, 2004, Toyota Professional Engineer Office, with an English translation.
"Analysis and Test Report: The Measurement of Dynamic Surface Tension of the Lipid, and Composition Analysis of Polyglycerol Ester," Feb. 25, 2004, Sumitomo Chemical Analysis Center, Osaka, Japan, with and English translation.
"Polyglycerol ester," Oct. 3, 1994, p. 195, Sakamoto Yakuhin Kogy Co., Ltd, Osaka, Japan, with an English translation.
Fujita, "Edible Fats and Oils—The Uses and Foods of Fats and Oils," Apr. 5, 2000, p. 98, Tokyo, Japan, with an English translation.
Extended Search Report from European Patent Office issued in corresponding European Patent Application No. 08710840.3 dated Mar. 9, 2011.
Office Action from Japanese Patent Office issued in corresponding Japanese Patent Application No. 2009-117597 dated Oct. 3, 2011, with a partial English translation.

* cited by examiner

*Primary Examiner* — Carolyn Paden
(74) *Attorney, Agent, or Firm* — Buchanan Ingersoll & Rooney PC

(57) ABSTRACT

The present invention discloses a fat and oil composition which comprises 25-60 mass % of a soft fractionated palm oil, a polyglycerol ester of fatty acids and a cooking oil other than palm oil,
wherein the soft fractionated palm oil comprises 25-38 mass % of a palmitic acid and 40-60 mass % of an oleic acid as constituent fatty acids, and O/P ratio (mass ratio of an oleic acid/a palmitic acid) is 1.3 or more, and
the polyglycerol ester of fatty acids has HLB of 1.0-7.5, and the ratio of an oleic acid in the constituent fatty acids thereof is 50-95 mass % and that of a stearic acid is 1.0-15 mass %. This fat and oil composition can be preferably used for frying foods, especially for frying tempura and fried chicken.

8 Claims, No Drawings

FAT AND OIL COMPOSITIONS FOR IMPROVING TEXTURE

TECHNICAL FIELD OF THE INVENTION

The present invention relates to cooking fat and oil compositions for keeping foods cooked with oil crispy for a long time.

BACKGROUND OF THE INVENTION

Generally, foods cooked with oil such as fried foods, tempura and fried chicken are cooked by coating fish, meat, vegetables and the like in batter mainly comprising flour, and frying them in oil of around 180° C. However, due to various complicated factors such as materials, temperature of batter, selected oil and temperature of frying oil, it is difficult to always provide light and crispy texture. Since it is also difficult to cook a lot of foods with oil at one time, it often takes 30 minutes to 1 hour until they are eaten after being cooked. In such a case, it is difficult to keep the fresh crispy texture of the foods, and they often get soggy.

In order to solve the above problems, Patent Literature 1 discloses fried foods having light texture by the method comprising the step of combining a specific soluble starch and a highly viscous starch. However, the method cannot be applied to frozen foods and, therefore, lacks versatility.

Further, Patent Literature 2 discloses a fat and oil of which flavor and texture are improved by the method comprising the step of adding Taihaku sesame oil to palm fat and oil with a low melting point. The foods cooked with said fat and oil are easy to be cooked, but it is difficult to keep crispy texture thereof for a long time.

In addition, Patent Literature 3 discloses batter having crispy texture by the method comprising the step of adding a mixture of sucrose esters of fatty acids having a specific composition to a usually used fat and oil. However, the description in the literature is limited to only frozen foods and, therefore, lacks versatility. Further, since the literature does not describe the reserve time thereof at ordinary temperature, it is not clarified whether the crispy texture is kept for a long time.

Patent Literature 1: JP-A 8-154610
Patent Literature 2: JP-A 2005-237313
Patent Literature 3: JP-A 8-298928

DISCLOSURE OF THE INVENTION

The object of the present invention is to provide fat and oil compositions for keeping foods cooked with oil crispy for a long time.

The inventors thoroughly searched to solve the above problem and found that the texture of foods cooked with oil is improved by combining a specific polyglycerol ester of fatty acids and a soft fractionated palm oil having certain relative proportions of fatty acids, and that the texture improving effect is sustained for a long time.

Namely, the present invention provides a fat and oil composition which comprises 25-60 mass % of a soft fractionated palm oil, a polyglycerol ester of fatty acids and a cooking oil other than palm oil,
wherein the soft fractionated palm oil comprises 25-38 mass % of a palmitic acid and 40-60 mass % of an oleic acid as constituent fatty acids, and O/P ratio (mass ratio of an oleic acid/a palmitic acid) is 1.3 or more, and the polyglycerol ester of fatty acids has HLB of 1.0-7.5, and the ratio of an oleic acid in the constituent fatty acids thereof is 50-95 mass % and that of a stearic acid is 1.0-15 mass %.

It becomes possible to keep foods cooked with oil crispy for a long time by adding a polyglycerol ester of fatty acids wherein HLB is 1.0-7.5 and the ratio of an oleic acid in the constituent fatty acids thereof is 50-95 mass % and that of stearic acid is 1.0-15 mass % to a soft fractionated palm oil wherein O/P ratio (mass ratio of an oleic acid/a palmitic acid) is 1.3 or more.

According to the present invention, when cooking foods with oil, it becomes possible to provide crispy texture of cooked foods without being affected by materials, temperature of batter, temperature of frying oil and the like. From such advantages, the fat and oil composition of the present invention can be preferably used for frying foods, especially for frying tempura and fried chicken.

BEST MODE FOR CARRYING OUT THE INVENTION (A Soft Fractionated Palm Oil)

A "soft fractionated palm oil" used in the present invention is an oil obtained by fractionating palm oil. Said oil is generally classified into olein, super olein, top olein, single olein, double olein, triple olein or the like, and the oil has to comprise 25-38 mass % of a palmitic acid and 40-60 mass % of an oleic acid as constituent fatty acids; and to have O/P ratio (mass ratio of an oleic acid/a palmitic acid) of 1.3 or more. Among them, it is preferably the soft fractionated palm oil which further comprises 0-4 mass % of a myristic acid, 0.5-6 mass % of a stearic acid, and 8-18 mass % of a linoleic acid as constituent fatty acids.

The soft fractionated palm oil used in the present invention exerts its effect wherein O/P ratio of the constituent fatty acids is 1.3 or more. The O/P ratio of the constituent fatty acids of the soft fractionated palm oil is more preferably 1.5 or more and 2.5 or less. In the present invention, the O/P ratio thereof is particularly preferably 1.5-2.0. Further, the ratio of P2O (dipalmitoyl oleoyl glycerol) in the triglyceride composition of the soft fractionated palm oil is preferably 0.1-15%, and particularly preferably 0.1-10%. The P2O composition is analyzed by GLC in accordance with ordinary method, and it is indicated as the peak area ratio of P2O in total area of chromatograph. The soft fractionated palm oil used in the present invention preferably comprises 40 mass % or more of an oleic acid, and more preferably comprises over 45 mass % of an oleic acid.

It is possible to use the soft fractionated palm oil of which the content in the fat and oil composition is 25 mass % or more. It is usually possible to use said oil of which the content is 25-60 mass %, preferably 25-50 mass %, more preferably 25-45 mass %, and most preferably 25-40 mass %.

Palm oil used as a raw material of a soft fractionated palm oil is not particularly limited and usually obtained by the following method. The clusters of oil palm are treated with steam and compressed to produce oil thereof. The produced oil is centrifuged to remove fibers and impurities and dried. Then, the oil is purified in accordance with ordinary method. Examples of the purification method include chemical purification and physical purification, and either of them is usable. Further, since palm oil is semisolid and semiliquid at ordinary temperature, fractionation is conducted to it depending on the use thereof, and the oil is often used as thus obtained fractionated oil. In addition, the purification of a fat and oil is conducted as needed before or after the fractionation to improve the quality thereof. It is also possible to conduct the purification twice, i.e. before and after the fractionation.

The fractionation method of palm oil for obtaining a soft fractionated palm oil is not particularly limited, and natural fractionation by cooling is usually used. It is also possible to use the fractionation method with a surfactant or a solvent. A soft fractionated palm oil is a medium-melting-point part or a low-melting-point part each of which is obtained by fractioning palm oil (a high-melting-point part is generally referred to as palm stearin). This fraction can be conducted twice or three times, and a low-melting-point part obtained by fractionation several times can be used.

(Method for Measuring Fatty Acid Composition of Fats and Oils)

The measurement was conducted in accordance with ordinary method, based on Standard Methods for the Analysis of Fats, Oils and Related Materials 2.2.7-1996 (Japan Oil Chemists' Society).

(A Polyglycerol Ester of Fatty Acids)

A "polyglycerol ester of fatty acids" used in the present invention is an ester obtained by reacting polyglycerol and fatty acids, and has HLB of 1.0-7.5 and preferably 3.5-7.5; and said polyglycerol ester of fatty acids wherein the ratio of an oleic acid in the constituent fatty acids is 50-95 mass % and preferably 70-95 mass %, and that of a stearic acid is 1.0-15 mass % and preferably 1.0-10 mass %. Among constituent fatty acids of a polyglycerol ester of fatty acids, fatty acids other than an oleic acid are preferably those having 12-20 carbon atoms.

(Method for Producing a Polyglycerol Ester of Fatty Acids)

It is possible to use a polyglycerol ester of fatty acids which is produced so that the HLB thereof and the ratio of an oleic acid in the constituent fatty acids thereof become within the above ranges.

A polyglycerol ester of fatty acids can be produced when the HLB thereof and the ratio of an oleic acid in the constituent fatty acids thereof are obvious. For example, it can be produced by the following method, but not limited thereto.

Polyglycerol and a fatty acid containing an oleic acid (oleic acid concentration: 50-95 mass %; stearic acid concentration: 1.0-15 mass % and preferably 1.0-10 mass %) are poured in a reaction container at an appropriate rate. A sodium hydroxide solution is added thereto as a catalyst. The mixture is heated to 200° C. or higher under the current of nitrogen gas and reacted for around 1-3 hours. Further, after the inner temperature thereof is heated to 250° C. or higher and reacted for 3-5 hours, the reactant is cooled down to ordinary temperature, and purified in accordance with ordinary method to obtain a polyglycerol ester of fatty acids. The obtained polyglycerol ester of fatty acids can be fractionated corresponding to the molecular weights as needed. It is also possible to use combination of several polyglycerol ester of fatty acids.

The content of a polyglycerol ester of fatty acids in the fat and oil composition of the present invention is preferably 0.01-2.0 mass % and more preferably 0.05-1.0 mass %.

(Other Fats and Oils)

In the present invention, a cooking oil other than palm oil is comprised in addition to a soft fractionated palm oil and a polyglycerol ester of fatty acids. For example, it is possible to blend in canola oil, corn oil, sunflower oil, safflower oil, sesame oil, cotton seed oil, rice bran oil, olive oil, peanut oil, flaxseed oil, soybean oil, or the like. In the present invention, it is preferable that the rest of a soft fractionated palm oil and a polyglycerol ester of fatty acids is a cooking oil other than palm oil.

The content of a cooking oil other than palm oil in the fat and oil composition of the present invention preferably comprises the rest of a soft fractionated palm oil and a polyglycerol ester of fatty acids. More specifically, the content thereof is preferably 39.99 mass % or more, more preferably 39.99-74.99 mass %, further more preferably 49.99-74.99 mass %, and most preferably 54.99-74.99 mass %. It is also preferable to use the cooking oil at 65 mass % or more.

(Soybean Oil)

"Soybean Oil" Used in the Present Invention is not Particularly Limited, and it is possible to use soybean oil produced by the ordinary method. It is preferable to use salad oil which is cooled down to 0-15° C. to remove a high-melting-point part. Soybean oil is usually filled up by the method comprising the steps of solvent extraction and purifications of degumming, deacidification, decoloring, dewaxing (as needed) and deodorizing. Examples of the purification method include chemical purification and physical purification, and either of them is usable. The fatty acid composition in soybean oil is not particularly limited, and, for example, it is possible to use soybean oil obtained from soybeans wherein a linolenic acid content is lowered by hybridization. The presence or absence of trans-fatty acids in soybean oil is not particularly limited.

The place of origin of soybeans which are a raw material is not particularly limited, and it is possible to use those made in the U.S., South America, or the like.

Normally, it is known that, when the blend ratio of soybean oil increases, a characteristic flavor occurs. However, the inventors found that the flavor of cooked foods can be improved by blending in soybean oil with a soft fractionated palm oil at a specific rate.

The content of soybean oil in the fat and oil composition of the present invention preferably comprises the rest of a soft fractionated palm oil and a polyglycerol ester of fatty acids. More specifically, the content thereof is preferably 39.99 mass % or more, more preferably 39.99-74.99 mass %, further more preferably 49.99-74.99 mass %, and most preferably 54.99-74.99 mass %. It is also preferable to use the soybean oil at 65 mass % or more.

(Other Components)

It is possible to comprise other components in the fat and oil composition to the extent that they do not impair the effects of the present invention. These components include those used in usual cooking fats and oils such as food additives. Examples thereof include antioxidants, crystal modifiers and texture improving agents.

Examples of the antioxidants include tocopherols, flavone derivatives, a kojic acid, gallic acid derivatives, catechin and the esters thereof, a fukiic acid, gossypol, sesamol and terpenes. Examples of crystal modifiers include polyglycerol ester of fatty acids, sucrose esters of fatty acids, sorbitan esters of fatty acids, polysorbate, polyglycerol condensed ricinolate and glyceride esters.

Besides, it is also possible to add spices or coloring components to the fat and oil composition. Examples of spices include capsaicin, anethole, eugenol, cineole and zingerone. Examples of coloring components include carotene and astaxanthin.

(Method for Producing the Fat and Oil Composition of the Present Invention)

The method for producing the fat and oil composition of the present invention is not particularly limited, and said composition can be produced by ordinary method.

As an example, the method for producing the fat and oil composition of the following Example 1 is illustrated. In such a case, the fat and oil composition can be usually produced by the method comprising the steps of mixing soybean oil, a soft fractionated palm oil and the above specified polyglycerol ester of fatty acids and stirring the mixture until it becomes equally combined. When mass-producing the composition, in order to make it easier to be mixed, it is possible to heat a soft fractionated palm oil and a polyglycerol ester of fatty acids to, for example, 40° C., and to mix and stir them with soybean oil.

(Usage of the Fat and Oil Composition of the Present Invention)

The fat and oil composition of the present invention makes it possible to keep foods cooked with said oil crispy for a long time. In addition to it, it is also possible to use the composition for foods eaten raw such as dressing and mayonnaise; stir-fries such as stir-fried vegetables, fried noodles and scrambled eggs; or broiled fish such as meuniere.

(Keeping the Texture of Cooked Foods after being Cooked with Oil)

"Keeping the texture of cooked foods" means that even if the foods cooked with oil are left for a certain period of time, the preferable texture thereof for human consumption is maintained. For example, it can be judged by the method of the following Example.

EXAMPLES

Next, Examples and Comparative Examples will further illustrate the present invention. They only explain the present invention and do not particularly limit the invention.

"%" mentioned below indicates mass % if there is no specific description.

In Examples, used as polyglycerol esters of fatty acids are followings:
(1) Sunsoft A173E by Taiyo Kagaku Co., Ltd. (HLB: 7.0, polymerization degree of polyglycerol: 5, a stearic acid: 3.0%, an oleic acid: 76.7%, a lauric acid: 4.6%, a myristic acid: 0.3%, a palmitic acid: 2.9%, a linoleic acid: 11.9%),
(2) Sunsoft Q175S by Taiyo Kagaku Co., Ltd. (HLB: 4.5, polymerization degree of polyglycerol: 10 or more, a stearic acid: 1.7%, an oleic acid: 85.6%, a lauric acid: 0.5%, a myristic acid: 1.2%, a palmitic acid: 6.5%, a linoleic acid: 3.8%),
(3) Ryotopolyglyester O50D by Mitsubishi-Kagaku Foods Corporation (HLB: 7.4, polymerization degree of polyglycerol: 10 or more, a stearic acid: 2.4%, an oleic acid: 77.7%, a lauric acid: 3.4%, a myristic acid: 1.2%, a palmitic acid: 3.1%, a linoleic acid: 11.6%),
(4) Sunsoft Q175 by Taiyo Kagaku Co., Ltd. (HLB: 12.0, a stearic acid: 3%, an oleic acid: 78%),
(5) Ryotopolyglyester ER60D by Mitsubishi-Kagaku Foods Corporation (HLB: 7.0, a stearic acid: 0%, an oleic acid: 0.2%),
(6) Sunsoft QMP-5 by Taiyo Kagaku Co., Ltd. (HLB: 4.1, a stearic acid: 3%, an oleic acid: 45.3%).

In Examples, used as fats and oils are followings:
(7) Nisshin Canola Oil by The Nisshin OilliO Group, Ltd.,
(8) Nisshin Soybean Salad Oil by The Nisshin OilliO Group, Ltd.,
(9) A soft fractionated palm oil internally prepared by The Nisshin OilliO Group, Ltd. (O/P ratio: 1.41, P2O: 16.5%, an oleic acid: 47.1%, a palmitic acid: 33.5%, a myristic acid: 1.1%, a stearic acid: 3.6%, a linoleic acid: 12.7%),
(10) A soft fractionated palm oil internally prepared by The Nisshin OilliO Group, Ltd. (O/P ratio: 1.75, P2O: 9.0%, an oleic acid: 51.3%, a palmitic acid: 29.3%, a myristic acid: 1.0%, a stearic acid: 3.1%, a linoleic acid: 13.8%).

(Evaluation of Cooked Foods)

A sweet potato was cut into 7 mm thick, immersed in water, and dried with kitchen paper. Then, the slices were dipped in batter (water:flour by Nisshin Flour milling Inc.=1.6:1.0) and placed into a fat and oil composition (the fat and oil composition of Table 1) heated to 180° C. and fried for 3 minutes. The fried slices were left and cooled down for 1 hour, and the texture thereof was evaluated. 20 panelists absolutely evaluated the texture based on the following evaluation criteria, and the average of ratings was calculated. Table 1 shows the results thereof. "–" in the table indicates that a fat and oil or an emulsifying agent is not used.

(Evaluation Criteria of Texture)
5: very crispy
4: crispy
3: moderately crispy
2: slightly crispy
1: not crispy

TABLE 1

| | Fat and oil (%) | | | | An emulsifying agent | | Texture just after frying (average of | Texture 1 hour later (average of |
|---|---|---|---|---|---|---|---|---|
| | (7) | (8) | (9) | (10) | Kind | Ratio (%) | n = 20) | n = 20) |
| Comp. Exam. 1 | 100 | — | — | — | — | — | 4.0 | 2.5 |
| Comp. Exam. 2 | — | — | 100 | — | — | — | 3.9 | 2.6 |
| Comp. Exam. 3 | — | — | — | 100 | — | — | 3.8 | 2.7 |
| Comp. Exam. 4 | 99.95 | — | — | — | (3) | 0.05 | 3.7 | 3.1 |
| Comp. Exam. 5 | — | 74.95 | 25.0 | — | (6) | 0.05 | 4.0 | 2.4 |
| Comp. Exam. 6 | — | 69.9 | 30.0 | — | (5) | 0.1 | 4.0 | 2.3 |
| Comp. Exam. 7 | — | 69.9 | — | 30.0 | (4) | 0.1 | 4.0 | 2.4 |
| Comp. Exam. 8 | — | 84.9 | — | 15.0 | (3) | 0.1 | 4.0 | 3.2 |
| Exam. 1 | — | 74.95 | 25.0 | — | (3) | 0.05 | 4.4 | 4.3 |
| Exam. 2 | — | 74.95 | — | 25.0 | (1) | 0.05 | 4.6 | 4.5 |
| Exam. 3 | — | 74.95 | — | 25.0 | (2) | 0.05 | 4.2 | 4.1 |
| Exam. 4 | — | 69.9 | — | 30.0 | (1) | 0.1 | 4.5 | 4.4 |
| Exam. 5 | — | 69.9 | — | 30.0 | (2) | 0.1 | 4.3 | 4.2 |

TABLE 1-continued

|  | Fat and oil (%) | | | | An emulsifying agent | | Texture just after frying (average of n = 20) | Texture 1 hour later (average of n = 20) |
| --- | --- | --- | --- | --- | --- | --- | --- | --- |
|  | (7) | (8) | (9) | (10) | Kind | Ratio (%) | | |
| Exam. 6 | — | 59.9 | — | 40.0 | (3) | 0.1 | 4.0 | 3.8 |
| Exam. 7 | — | 69.8 | | 30.0 | (2) + (6) | 0.1 + 0.1 | 4.5 | 4.0 |

As indicated in Table 1, the foods cooked with the fat and oil composition comprising a polyglycerol ester of fatty acids wherein HLB is 7.5 or less and the ratio of an oleic acid in the constituent fatty acids thereof is 70 mass % or more (Examples 1-6) were kept crispy for a long time as compared to those cooked with the fat and oil composition not comprising an emulsifying agent (Comparative Examples 1-3) or those cooked with the fat and oil composition comprising a polyglycerol ester of fatty acids wherein HLB is over 7.5 and the ratio of an oleic acid in the constituent fatty acids thereof is 70 mass % or less (Comparative Examples 5-6).

Further, the foods cooked with the fat and oil composition wherein the content of a soft fractionated palm oil is 25 mass % or more (Examples 1-6) were kept crispy for a long time as compared to those cooked with the fat and oil composition wherein the content of a soft fractionated palm oil is less than 25 mass % (Comparative Examples 4, 8).

The evaluation of flavor was also conducted by the same method as that of Table 1.

TABLE 2

|  | Fat and oil | | | An emulsifying agent | | Flavor |
| --- | --- | --- | --- | --- | --- | --- |
|  | (7) | (8) | (9) | Kind | Ratio | |
| Comp. Exam. 9 | 69.9 | — | 30 | (1) | 0.1 | Too light (not enough) |
| Exam. 8 | — | 69.9 | 30 | (1) | 0.1 | Having rich flavor |

It was confirmed from Table 2 that the flavor of the cooked food becomes rich by blending in soybean salad oil with a soft fractionated palm oil and adding a polyglycerol ester of fatty acids thereto, and said flavor cannot be brought out by mixing canola oil, a soft fractionated palm oil and a polyglycerol ester of fatty acids.

What is claimed is:

1. A fat and oil composition which comprises 25-60 mass % of a soft fractionated palm oil, a polyglycerol ester of fatty acids and a cooking oil other than palm oil,
   wherein the soft fractionated palm oil comprises 25-38 mass % of a palmitic acid and 40-60 mass % of an oleic acid as constituent fatty acids, and O/P ratio (mass ratio of an oleic acid/a palmitic acid) is 1.3 or more, and
   the polyglycerol ester of fatty acids has HLB of 1.0-7.5, and the oleic acid in the constituent fatty acids thereof is 50-95 mass % and that of a stearic acid is 1.0-15 mass %.

2. The fat and oil composition according to claim 1, wherein the oleic acid in the constituent fatty acids of the polyglycerol ester of fatty acids is 70-95 mass %.

3. The fat and oil composition according to claim 1, wherein the content of the polyglycerol ester of fatty acids is 0.01-2.0 mass %.

4. The fat and oil composition according to claim 1, wherein the O/P ratio of the constituent fatty acids of the soft fractionated palm oil is 1.5 or more.

5. The fat and oil composition according to claim 1, wherein the rest of the soft fractionated palm oil and the polyglycerol ester of fatty acids is a cooking oil other than palm oil.

6. The fat and oil composition according to claim 1, wherein the cooking oil other than palm oil is soybean oil.

7. The fat and oil composition according to claim 6, wherein the soybean oil is soybean salad oil.

8. The fat and oil composition according to claim 1 for frying.

* * * * *